(12) United States Patent
Matsuda et al.

(10) Patent No.: US 7,910,150 B2
(45) Date of Patent: Mar. 22, 2011

(54) WATER-SOLUBLE DIETARY FIBER-CONTAINING COMPOSITION AND METHOD FOR PREPARING SAME

(75) Inventors: Isao Matsuda, Itami (JP); Yasuo Katta, Akashi (JP); Kensaku Shimada, Osaka (JP); Takamasa Kiyoshima, Itami (JP)

(73) Assignee: Matsutani Chemical Industries Co., Ltd., Hyogo-ken (JP)

( * ) Notice: Subject to any disclaimer, the term of this patent is extended or adjusted under 35 U.S.C. 154(b) by 705 days.

(21) Appl. No.: 11/353,975

(22) Filed: Feb. 15, 2006

(65) Prior Publication Data

US 2006/0188633 A1    Aug. 24, 2006

(30) Foreign Application Priority Data

Feb. 21, 2005   (JP) ................................. 2005-044209
Dec. 22, 2005   (JP) ................................. 2005-370275

(51) Int. Cl.
A23L 1/308   (2006.01)

(52) U.S. Cl. ........ 426/658; 426/549; 426/615; 426/573; 426/270; 426/629; 426/575; 426/576; 426/578; 426/471

(58) Field of Classification Search .................. 426/496, 426/658, 549, 615, 573, 270, 629, 575, 576, 426/578, 471

See application file for complete search history.

(56) References Cited

U.S. PATENT DOCUMENTS

| | | | | |
|---|---|---|---|---|
| 4,707,376 A | * | 11/1987 | Muraoka et al. | 426/658 |
| 5,591,471 A | | 1/1997 | Niwano et al. | |
| 5,629,036 A | | 5/1997 | Yanetani et al. | |
| 5,766,662 A | * | 6/1998 | Inglett | 426/481 |
| 6,495,190 B1 | * | 12/2002 | Yaginuma et al. | 426/615 |

FOREIGN PATENT DOCUMENTS

| | | | |
|---|---|---|---|
| EP | 0 363 481 A1 | | 4/1990 |
| EP | 0 582 518 A2 | | 2/1994 |
| JP | 04-030773 A | | 2/1992 |
| JP | 4-51840 A | | 2/1992 |
| JP | 04-148654 A | | 5/1992 |
| JP | 07-023739 A | | 1/1995 |
| JP | 8-289715 A | | 11/1996 |
| JP | 2779616 B2 | * | 7/1998 |
| JP | 10-243777 A | | 9/1998 |
| JP | 2000-316507 A | | 11/2000 |
| JP | 2001-45960 A | | 2/2001 |
| JP | 2003-093017 A | | 4/2003 |
| JP | 2003-102426 A | | 4/2003 |
| JP | 2004-242577 A | | 9/2004 |
| JP | 2005185211 | * | 7/2005 |
| WO | WO 96/00509 A1 | | 1/1996 |
| WO | WO 9600509 A1 | * | 1/1996 |

OTHER PUBLICATIONS

Database WPI, Section Ch, Week 199206, Derwent Publications Ltd., London, GB; AN 1992-045614, XP002387791 & JP 03 290170 (Nippon Kayaku KK) Dec. 19, 1991, abstract.

Falbe J., Regitz, M. (Editors): "Römpp Lexikon," 1995, Thieme, Stuttgart; New York, XP002387787, pp. 95-96.

* cited by examiner

*Primary Examiner* — Jennifer C McNeil
*Assistant Examiner* — Hong Mehta
(74) *Attorney, Agent, or Firm* — Sughrue Mion, PLLC

(57) ABSTRACT

A water-soluble dietary fiber-containing composition comprises a water-soluble dietary fiber material and a thickening polysaccharide in a mixing ratio, by mass, ranging from 95:5 to 80:20 and has a solubility, in water at 30° C., of not more than 80%. The composition may be prepared by a method comprising the steps of dissolving, in water, a water-soluble dietary fiber material and a thickening polysaccharide such that the mixing ratio of the former to the latter, by mass, ranges from 95:5 to 80:20 and then drying the resulting aqueous solution. The composition has a low solubility in water and therefore, can be incorporated into various foods, while maintaining desired excellent quality thereof without being accompanied by the reduction of the working characteristics of the raw materials for these foods.

7 Claims, No Drawings

WATER-SOLUBLE DIETARY FIBER-CONTAINING COMPOSITION AND METHOD FOR PREPARING SAME

BACKGROUND OF THE INVENTION

The present invention relates to a water-soluble dietary fiber-containing composition useful in the production of functional foods and a method for the preparation of the same.

Raw materials for foods having functional characteristics have attracted the attention of many people in proportion to the recent increased population of the health-oriented persons. There have recently been put on the market a large number of and a wide variety of foods, which make the most use of the raw materials possessing functionality, in consideration of the present conditions of the consumers concerning foods. There can be mentioned, for instance, dietary fibers as one of such raw materials for foods. The dietary fibers possess a variety of beneficial physiological functions and they are relatively cheap raw materials for foods. For this reason, they have become of major interest lately as raw materials for functional foods and have widely been used.

Raw materials for dietary fibers include water-insoluble ones and water-soluble ones. Examples of such water-insoluble raw materials for dietary fibers are cellulose, wheat bran, fibers originated from apples, fibers derived from sweet potatoes, and chitin. The water-soluble raw materials for dietary fibers are roughly divided into high viscous ones and low viscous ones and examples of such high viscous water-soluble raw materials are pectin, powdered konjak (mannan) (powdered devil's tongue), alginic acid salts, propylene glycol ester of alginic acid, guar gum, and agar; while examples of lowly viscous water-soluble raw materials are hardly digestible dextrin, polydextrose, branched maltodextrin, inulin and guar gum hydrolysates. These substances possess various kinds of physiological functions such as the reduction of the content of cholesterol, the inhibition of an increase in the blood sugar level, the regulation of intestinal function, the prevention of carcinoma of large intestine and the excretion of harmful substances.

In addition, there can likewise be listed, for instance, oligosaccharides as a kind of raw materials for dietary fibers. The oligosaccharide is a lowly viscous and water-soluble saccharide and it has a wide variety of functionalities such as a hypocariogenic effect, low-caloric characteristics, regulation of intestinal function and a Bifidus bacteria-proliferation function. Typical examples of such oligosaccharides are fructo-oligosaccharides, galacto-oligosaccharides, and xylo-oligosaccharides.

Incidentally, as has been described above, there have recently been put on the market a wide variety of foods to which various functionalities are imparted while making the most use of the raw materials for dietary fibers. However, each food should be inherent in beautiful feeling or appearance, even if it has a specific function such as a physiological one and it should satisfy various requirements or possess the essential elements inherent in or peculiar to the food per se such as the beautiful appearance, taste and palatability as well as fine flavor.

Among the raw materials for dietary fibers, raw materials fundamentally easily used in foods include water-soluble ones each having a low viscosity value (such as hardly digestible dextrin, polydextrose and branched maltodextrin) and oligosaccharides and these raw materials can be incorporated into water-soluble foods such as beverages, soup and yoghurt in any required amount without any difficulty. In foods in the form of solids such as bakery's foods, however, some problems arise such that the working properties of raw materials for such foods are impaired and that the resulting foods have deteriorated quality such as taste and palatability, as the added amount of such dietary fibers increases. For instance, when hardly digestible dextrin is incorporated into breads, the dietary fibers can be used in an amount of not more than 8% by mass on the basis of the total mass of the flour used without adversely affecting the working properties of the raw materials for such foods and the quality of the resulting foods. On the other hand, if hardly digestible dextrin is incorporated into a Food for Specified Health Use in an amount of not less than 12% by mass on the basis of the total mass of the flour used, for ensuring an effect of inhibiting an increase in the blood sugar level or a regulation of intestinal function, it has been confirmed that the formation of gluten is inhibited due to the highly water-soluble characteristics of the hardly digestible dextrin and that this in turn leads to a variety of drawbacks such as the obstruction of the molding of the resulting dough, the reduction of the working properties, and the deterioration of the quality of the resulting food, for instance, the formation of a food having extremely soft taste and palatability.

Moreover, in case of water-soluble and highly viscous dietary fibers (for instance, thickening polysaccharides such as alginic acid and agar) among others, problems arise, if they are used in breads and the added amount thereof increases, such that the quality of the resulting food is deteriorated, for instance, the food has a rather hard feeling when eating the same. For this reason, these dietary fibers have been incorporated into these foods only in a small amount for the purpose of improving the quality of the resulting foods and/or the working properties of raw materials therefor.

Up to now, there have been proposed various improving means which permit the addition of a large amount of dietary fibers, in particular, water-soluble dietary fibers to bakery's foods or noodles or vermicelli, to solve these problems.

Patent Document 1 proposes a method for the addition of hardly digestible dextrin as water-soluble dietary fibers in the principal kneading step of the sponge dough method during the kneading process when producing a bakery's product, but these means are not sufficient for improving the bread-preparation aptitude (working characteristics in bread-production), and for improving the taste, palatability, internal phase and appearance of the resulting breads.

Patent Document 2 proposes a baking food comprising wheat dough and dietary fibers coated with oils and fats and dispersed in the dough as well as a method for the preparation thereof, but this method is likewise insufficient for the improvement of the kneading characteristics (working characteristics in food-production), and the taste and palatability of the resulting food.

Patent Document 3 proposes a method for preparing noodles, bakery's foods and snack food, which comprise a composition containing a water-soluble dietary fiber material and modified starch and incorporated into these foods. However, this method is not sufficient for improving the kneading characteristics (working characteristics in food-production), and the taste and palatability of the resulting food.

Patent Document 4 proposes a method for the preparation of dietary fiber-fortified noodles, which makes use of fine cellulose-containing composite material as a principal ingredient when preparing noodles, but this method does not permit the solution of the problem concerning the taste and palatability of the resulting foods and it also suffers from a problem such that it requires increased production cost.

Patent Document 5 proposes a method for the preparation of dietary fiber-enriched breads, which makes use of fine cellulose-containing composite material as a principal ingredient, but this method does not permit the solution of the problem concerning the taste and palatability of the resulting foods and it also suffers from a problem in that it requires increased production cost.

Patent Document 1: JP-A-4-51840;
Patent Document 2: JP-A-8-289715;

Patent Document 3: JP-A-10-243777;
Patent Document 4: JP-A-2000-316507; and
Patent Document 5: JP-A-2001-45960

SUMMARY OF THE INVENTION

Accordingly, it is an object of the present invention to provide a water-soluble dietary fiber-containing composition, which can eliminate the foregoing problems encountered when adding water-soluble dietary fiber materials to a variety of foods, or which permits the easy incorporation of dietary fibers in an amount sufficient for imparting various physiological effects such as an effect of inhibiting an increase in the blood sugar level, an effect of regulating intestinal functions and an effect of controlling lipid-metabolizing functions, in particular, to bakery's foods and noodles quite susceptible to the foregoing problems when incorporating water-soluble dietary fibers into the same and which permits the easy preparation of bakery's foods and noodles possessing excellent quality and it is also an object of the present invention to provide a method for preparing the composition and to provide a functional foods obtained using the composition.

The inventors of this invention have conducted various studies to solve the foregoing problems associated with the conventional techniques, have found that a water-soluble dietary fiber-containing composition can be prepared by drying an aqueous solution containing a water-soluble dietary fiber material and a thickening polysaccharide in a predetermined mixing ratio, that the resulting composition permits the reduction of the water-solubility of the water-soluble dietary fibers which are, by nature, easily dissolved in water and that the addition of the composition to bakery's foods and noodles in an excess does not adversely affect the working characteristics during the production of these foods and/or the quality of the resulting foods and have thus completed the present invention.

Accordingly, the present invention herein provides a water-soluble dietary fiber-containing composition useful in the production of functional foods and a method for the preparation thereof as will be detailed below:

1. A water-soluble dietary fiber-containing composition comprising a water-soluble dietary fiber material and a thickening polysaccharide in a mixing ratio, by mass, ranging from 95:5 to 80:20 and having solubility, in water at 30° C., of not more than 80%.
2. The water-soluble dietary fiber-containing composition as set forth in the foregoing item 1, wherein the water-soluble dietary fiber material is at least one member selected from the group consisting of hardly digestible dextrin, polydextrose, branched maltodextrin, inulin and oligosaccharides.
3. The water-soluble dietary fiber-containing composition as set forth in the foregoing item 1 or 2, wherein the thickening polysaccharide is at least one member selected from the group consisting of alginic acid salts, propylene glycol ester of alginic acid and agar.
4. The water-soluble dietary fiber-containing composition as set forth in any one of the foregoing items 1 to 3, wherein the solubility, in water at 30° C., is not more than 70%.
5. A method for the preparation of a water-soluble dietary fiber-containing composition as set forth in any one of the foregoing items 1 to 4, comprising the steps of dissolving, in water, a water-soluble dietary fiber material and a thickening polysaccharide such that the mixing ratio, by mass, ranges from 95:5 to 80:20 and then drying the resulting aqueous solution.
6. The method for the preparation of a water-soluble dietary fiber-containing composition as set forth in the foregoing item 5, wherein the drying is spray drying.
7. A food characterized in that it comprises a water-soluble dietary fiber-containing composition as set forth in any one of the foregoing items 1 to 4.
8. The food as set forth in the foregoing item 7, wherein it is a bakery's food or a noodle.

The water-soluble dietary fiber-containing composition according to the present invention has a low solubility in water and therefore, the composition can be incorporated into various foods such as bakery's foods and various kinds of noodles in an amount sufficient for imparting, to these foods, physiological effects such as an effect of inhibiting an increase in the blood sugar level, an effect of regulating intestinal functions and an effect of controlling lipid-metabolizing functions of consumers of these foods while certainly maintaining desired excellent quality thereof without being accompanied by the reduction of the working characteristics of the raw materials for these foods.

BEST MODE FOR CARRYING OUT THE INVENTION

In the present invention, the term "a raw material for water-soluble dietary fibers (a water-soluble dietary fiber material)" used means hardly digestible saccharides each containing dietary fibers in an amount of not less than 50% by mass as expressed in terms of the value determined according to AOAC2001.03; having such a solubility that not less than 20 g thereof is dissolved in 100 ml of water at 20° C.; and having a viscosity of less than 20 mPas as determined at 20° C. for a 5% by mass aqueous solution thereof. More specifically, examples thereof are hardly digestible dextrins (examples thereof available from the market include those available from Matsutani Chemical Industry Co., Ltd. under the trade names of "PINEFIBRE" and "FIBERSOL 2"); polydextrose (such as a product available from Danisco Culter Japan Inc. under the trade name of "Litesse"); branched maltodextrins (such as a product available from Roquette Freres under the trade name of "NUTRIOSE"); inulin or hydrolysates thereof; guar gum hydrolysates; or a variety of oligosaccharides such as fructo-oligosaccharide, galacto-oligosaccharide, xylo-oligosaccharide. In addition to the foregoing, examples of water-soluble dietary fiber materials likewise include all of hardly digestible saccharides which can satisfy the foregoing requirements such as low viscosity and water-solubility. The hardly digestible dextrin is most efficiently and preferably used in the present invention among the foregoing water-soluble dietary fiber materials.

The hardly digestible dextrin has an average molecular weight of about 2000. It is obtained by heat-treating starch, further hydrolyzing the heat-treated starch with an enzyme, followed by decolorizing the hydrolyzed product and the subsequent demineralization. Further details thereof are disclosed in "The Forum of New Materials for Foods", No. 3 (edited by Conference on New Materials for Foods, 1995).

Moreover, the term "thickening polysaccharide" used in the present invention means polysaccharides each having a viscosity value of not less than 20 mPas as determined at 20° C. for a 5% by mass aqueous solution thereof. Specific examples thereof are alginic acid salts, propylene glycol ester of alginic acid, agar (in this case, the viscosity is defined to be that determined for a solution thereof in hot water at 80° C.), powdered konjak (mannan) (powdered devil's tongue), carrageenan, guar gum, starch and starch derivative. In addition to the foregoing, examples of such thickening polysaccharide likewise include all polysaccharides which can satisfy the foregoing requirements concerning the viscosity. As the thickening polysaccharides used in the present invention, most efficiently and preferably used herein are alginic acid salts, propylene glycol ester of alginic acid and a blend of an alginic acid salt with propylene glycol ester of alginic acid having any arbitrary mixing ratio, and agar, among these thickening polysaccharides.

Alginic acid salts are naturally occurring polysaccharides peculiar to brown algae such as sea tangles and wakame seaweed and can be extracted from these brown algae by treating them with an acid or an alkali to make the algae get swollen and to thus extract the desired polysaccharides. Specific examples of the salts thereof are sodium, potassium, calcium and ammonium salts, with sodium and potassium salts being preferably used herein. The sodium salt thereof is sold under the trade name of, for instance, "KIMICA ALGIN" (available from Kimica corporation).

Propylene glycol ester of alginic acid is one obtained by acting propylene oxide on alginic acid to thus convert the carboxyl group of the latter into a propylene glycol ester (propylene glycol monoester) and specific example thereof is a product available from Kimica corporation under the trade name of "KIMILOID".

Agar is a naturally occurring polysaccharide peculiar to red algae such as Gracilaria and Gelidium may be commercially available and specific examples thereof include "INA KANTEN" (available from INA FOOD INDUSTRY Co., Ltd.).

The water-soluble dietary fiber-containing composition according to the present invention, which comprises a water-soluble dietary fiber material and a thickening polysaccharide in a mixing ratio, by mass, ranging from 95:5 to 80:20 and which has solubility, in water at 30° C., of not more than 80%, can be prepared by, for instance, dissolving 80 to 95% by mass of the foregoing water-soluble dietary fiber material and 20 to 5% by mass of the aforementioned thickening polysaccharide in hot water to form an aqueous solution and then drying the resulting aqueous solution to convert the same into powder. In this respect, drying methods usable herein include, for instance, spray drying, drum drying, freeze drying and/or extrusion-granulation techniques. Among these drying techniques, most preferably used herein is the spray drying technique. In this regard, the dried product thus obtained may further be subjected to granulation. The aqueous solution containing a water-soluble dietary fiber material and a thickening polysaccharide is highly viscous and therefore, the spray drying step is preferably carried out while using a solution having a concentration ranging from 10 to 20% and maintaining the solution at a temperature ranging from 60 to 80° C. The spray drying step is preferably carried out, for instance, under the following conditions: an inlet temperature ranging from 160 to 180° C.; an outlet temperature ranging from 90 to 110° C.; and a rotational frequency of atomizer ranging from 15000 to 25000 rpm.

In this specification, the term "solubility" used means the value obtained by introducing 100 ml of water maintained at 30° C. into a 200 ml volume beaker, adding, to the water, 10 g of a water-soluble dietary fiber-containing composition while stirring the water at a rotational frequency of 200 rpm using a stirrer, determining the degree of Brix (Brix value) (sugar concentration (w/w %)) after 10 minutes using a digital refractometer (ATAGO RX-5000) and calculating the solubility according to the following equation based on the Brix value:

Solubility (%)=[(Brix value)/10]×100

The water-soluble dietary fiber-containing composition of the present invention should have a solubility in water at 30° C. of not more than 80%, preferably not more than 70% and more preferably not more than 60%. If the solubility exceeds 80%, the addition of the dietary fibers to a food in an amount sufficient for ensuring the physiological effects thereof would adversely affect the quality of the resulting food and the operation efficiency of the food production processes.

The ratio of the amount of the water-soluble dietary fiber material to that of the thickening polysaccharide may vary depending on the kinds of foods to which the composition of the present invention is subsequently added, but if the amount of the water-soluble dietary fiber material exceeds 95%, the solubility of the resulting mixture increases and bad influences possibly observed when only the water-soluble dietary fiber material is used may be observed. On the other hand, if the amount of the water-soluble dietary fiber material used is less than 80%, the solubility of the mixture is reduced, but there would be observed various adverse effects of the thickening polysaccharides on, for instance, taste and palatability of the resulting food.

The water-soluble dietary fiber-containing composition of the present invention does not adversely affect the quality of the resulting foods and the operation efficiency of the food production processes, when it is added to the foods in a desired amount sufficient for imparting, to the foods, various physiological effects such as an effect of inhibiting an increase in the blood sugar level, an effect of regulating the intestinal functions, and an effect of controlling lipid-metabolizing functions of consumers of these foods.

The functional foods may be one in which the water-soluble dietary fiber-containing composition according to the present invention efficiently shows the foregoing effects thereof and particularly preferred examples thereof are foods in the solid forms, in particular, bakery's foods, and various kinds of noodles.

Examples of such Bakery's foods include breads, cakes, cookies and biscuits. When the conventional water-soluble dietary fibers are incorporated into these foods, problems arise such that the working characteristics of the raw material during the kneading step are reduced and that the resulting food has deteriorated quality due to the inhibition of the formation of gluten-networks, since the conventional dietary fibers are water-soluble and has a high solubility. However, the use of the water-soluble dietary fiber-containing composition of the present invention would permit the solution of the foregoing problems associated with the conventional techniques, allow the achievement of excellent working characteristics of the raw material for each desired food and likewise permit the easy preparation of a functional food which is excellent in the quality and which has a variety of physiological effects such as an effect of inhibiting an increase in the blood sugar level, an effect of regulating the intestinal functions and an effect of controlling lipid-metabolizing functions of consumers of these foods.

Examples of the noodles are frozen noodles and light quickly preparable noodles and even when the composition of the present invention is used in these foods, the same effects observed for the bakery's foods can be ensured.

Each of these functional foods which have a variety of physiological effects such as an effect of inhibiting an increase in the blood sugar level, an effect of regulating the intestinal functions and an effect of controlling lipid-metabolizing functions of consumers of these foods can be prepared by adding the water-soluble dietary fiber-containing composition of the present invention to the raw materials conventionally known and used for preparing the corresponding food in a desired amount, and then processing the resulting mixture as a raw material according to the conventionally known method for the preparation of the same. The method for the addition of the composition is not restricted to any particular one and the method for the preparation of each food is not likewise limited to any specific one.

Incidentally, it is effective, in the present invention, to use a lowly viscous water-soluble dietary fiber material as the principal component of the dietary fibers, while the water-insoluble dietary fiber materials and water-soluble and highly viscous dietary fiber materials contribute less to the intended effects of the present invention. However, these dietary fiber materials have long been used in each food for the purpose of improving the physical properties thereof and/or the processing characteristics of the ingredient for the food or the operation efficiency of the production method and therefore, these dietary fiber materials may be used in combination with lowly viscous water-soluble dietary fiber material for each particular purpose. For instance, xanthan gum is used to adjust the butter viscosity of cake; and xanthan gum or guar gum is added to noodles for increasing the resilience and/or stiffness thereof. Further, starch and modified starch have been used for the similar purposes and accordingly, they may likewise be used in the present invention in such an amount that they do not adversely affect the desired effects of the present invention.

In addition, if it is also desired to impart physiological functions other than those observed for the dietary fibers and for the nutritional fortification to each particular food in addition to the effects of the dietary fibers, each food may further additionally comprise components having intended functions such as polyvalent unsaturated fatty acids, peptides, glycosides, vitamins, polyphenols and minerals.

The present invention will hereunder be described in more detail with reference to the following Examples, but the present invention is not restricted to these particular Examples at all. In the following Examples, the term "part" means "part by mass" unless otherwise specified.

EXAMPLE 1

A square-shaped bread was prepared according to the sponge dough method using the following ingredients in a mixing ratio likewise specified below. A dietary fiber material was added to the foregoing ingredients during the principal kneading step in an amount ranging from 12 to 12.6 parts per 100 parts of hard flour. At this stage, the following three types of dietary fiber materials were used: (1) hardly digestible dextrin "FIBERSOL 2" (available from Matsutani Chemical Industry Co., Ltd.); (2) a 95:5 (mass ratio) mixture of the hardly digestible dextrin with sodium alginate "KIMICA ALGIN I-1" (available from Kimica corporation); (3) a water-soluble dietary fiber-containing composition obtained by dissolving the hardly digestible dextrin and the sodium alginate in hot water in such a manner that the final mixing ratio of the former to the latter reached 95:5 (mass ratio) to give an aqueous solution and then spray-drying the solution (under the following spray-drying conditions: an inlet temperature of 160° C.; an outlet temperature of 100° C.; and a rotational frequency of the atomizer of 19000 rpm) to convert the solution into powder. In this respect, the added amount of the dietary fiber material was controlled in such a manner that the content of the lowly viscous water-soluble dietary fibers (the hardly digestible dextrin in this Example) was adjusted to 12 parts per 100 parts of hard flour.

The square-shaped bread prepared according to the foregoing formulation was so designed that the content of the dietary fibers originated from the hardly digestible dextrin was equal to 5 g per unit meal (this was herein defined to be 100 g). The resulting square-shaped bread was evaluated according to the following evaluation criteria:
Preparation Method of Square-Shaped Bread
(Ingredients and Mixing Ratio Thereof)

| (a) Sponge Mixing | |
|---|---|
| Hard flour | 70 parts |
| Yeast | 2 parts |
| Yeast food | 0.12 part |

| -continued | |
|---|---|
| Water | 42 parts |
| (b) Dough Mixing | |
| Hard flour | 30 parts |
| Dietary fiber material | 12 to 12.6 parts |
| Sugar | 5 parts |
| Common salt | 2 parts |
| Powdery skimmed milk | 2 parts |
| Shortening | 6 parts |
| Yeast | 0.4 part |
| Water | 26 parts |

(Conditions for Preparation)

Sponge-kneading temperature: 24° C.; Sponge-fermentation time: 4 hours; Dough-kneading temperature: 28° C.; Floor time: 25 minutes; Dividing: 230 g×3; Bench time: 15 minutes; Proof box: 60 minutes; Baking temperature: 175° C.; and Baking time: 22 minutes.

Evaluation Criteria:

(Bread-Preparation Aptitude)

⊚: The dough is quickly unified and the working characteristics of the dough are excellent, during the mixing step;

◯: The unification of the dough and the working characteristics thereof observed during the mixing step are good;

Δ: The unification of the dough and the working characteristics thereof observed during the mixing step are not good; and ×: The unification of the dough and the working characteristics thereof observed during the mixing step are bad.

(Appearance)

⊚: The oven kick (oven spring), the baked color and the luster are quite good;

◯: The oven kick, the baked color and the luster are good;

Δ: The oven kick, the baked color and the luster are not good; and

×: The oven kick and the luster are bad and the baking color is non-uniform.

(Crumb)

⊚: The cell walls between bubbles are thin and the color tone is excellent;

◯: The cell walls between bubbles are slightly thin and the color tone is good;

Δ: The cell walls between bubbles are slightly thick and the color tone is not good; and ×: The cell walls between bubbles are thick and the color tone is bad.

(Taste, Palatability and Flavor)

⊚: The bread is quite soft, easily dissolvable in the mouth and gives out quite good flavor;

◯: The bread is soft, easily dissolvable in the mouth and gives out good flavor;

Δ: The bread is slightly hard, not easily dissolvable in the mouth and gives out a slightly bad smell; and ×: The bread is hard, hardly dissolvable in the mouth and gives out a bad smell.

The results obtained in the foregoing evaluation are summarized in the following Table 1. The data listed in Table 1 clearly indicate that the composition of the present invention does not exert any significant adverse effects on the bread preparation even if it is incorporated into bread in an amount ranging from 12 to 12.6 parts per 100 parts of hard flour.

TABLE 1

| Dietary Fiber Material | Solubility (%) | Bread-Prep. Aptitude | Evaluation results on square-shaped bread prepared by way of trial | | Taste, Palatability & Flavor |
| --- | --- | --- | --- | --- | --- |
| | | | Appearance | Crumb | |
| Hardly digestible dextrin | 100 | X | Δ | X | X |
| Blend of hardly digestible dextrin and alginic acid salt | 100 | Δ | ○ | Δ | X |
| Product obtained by admixing and dissolving hardly digestible dextrin and alginic acid salt and then spray-drying the resulting solution | 70 | ○ | ◎ | ◎ | ○ |

EXAMPLE 2

The same procedures used in Example 1 were repeated except that hardly digestible dextrin and sodium alginate were admixed together in a mass ratio specified in the following Table 2, the resulting mixture was dissolved in hot water, the resulting solution was then spray-dried to give a water-soluble dietary fiber-containing composition and the composition was used as the dietary fiber material to prepare square-shaped bread. Thereafter, the bread was evaluated on the basis of the same evaluation criteria used in Example 1. The results obtained in the foregoing evaluation are summarized in the following Table 2. The data listed in Table 2 clearly indicate that the mass ratio of the hardly digestible dextrin to the sodium alginate falling within the range of from 95:5 to 80:20 is quite suitable for the preparation of bread.

TABLE 2

| Dietary Fiber Material | | | Evaluation results on square-shaped bread prepared by way of trial | | | |
| --- | --- | --- | --- | --- | --- | --- |
| Rate of hardly digestible dextrin (%) | Rate of alginic acid salt (%) | Solubility (%) | Bread-Prep. Aptitude | Appearance | Crumb | Taste, Palatability and Flavor |
| 97.5 | 2.5 | 90 | X | ○ | Δ | X |
| 95 | 5 | 70 | ○ | ◎ | ◎ | ○ |
| 90 | 10 | 40 | ◎ | ◎ | ○ | ○ |
| 80 | 20 | 40 | ○ | ○ | Δ | Δ |
| 70 | 30 | 40 | Δ | Δ | X | X |

EXAMPLE 3

Hardly digestible dextrin was admixed with various kinds of thickening polysaccharides including alginic acid salts as shown in the following Table 3 in mixing ratios likewise specified in Table 3, followed by the dissolution of the resulting mixture in hot water and the subsequent spray-drying of the solution to form each corresponding water-soluble dietary fiber-containing composition. Then the same procedures used in Example 1 were repeated except for using the resulting compositions as the dietary fiber materials to prepare square-shaped bread and the resulting bread was evaluated on the basis of the same evaluation criteria used in Example 1. The results obtained in the foregoing evaluation are summarized in Table 3. The data listed in Table 3 clearly indicate that sodium alginate, propylene glycol ester of alginic acid and agar are quite suitable for the preparation of bread as the thickening polysaccharide components.

TABLE 3

| Dietary Fiber Material | | | | Evaluation results on square-shaped bread prepared | | | |
| --- | --- | --- | --- | --- | --- | --- | --- |
| Water-soluble dietary fibers | Thickening polysaccharide | Mixing ratio | Solubility (%) | Bread-Prep. Aptitude | Appearance | Crumb | Taste, Palatability & Flavor |
| Hardly digestible dextrin | None | — | 100 | X | Δ | X | X |
| Hardly digestible dextrin | Alginic acid salt | 95:5 | 70 | ○ | ◎ | ◎ | ○ |

TABLE 3-continued

| Dietary Fiber Material | | | | Evaluation results on square-shaped bread prepared | | | |
|---|---|---|---|---|---|---|---|
| Water-soluble dietary fibers | Thickening polysaccharide | Mixing ratio | Solubility (%) | Bread-Prep. Aptitude | Appearance | Crumb | Taste, Palatability & Flavor |
| Hardly digestible dextrin | Propylene glycol ester of alginic acid | 95:5 | 60 | △ | ◎ | ◎ | ◎ |
| Hardly digestible dextrin | Agar | 90:10 | 40 | ◎ | ◎ | ○ | ○ |

EXAMPLE 4

A water-soluble dietary fiber-containing composition was prepared by admixing hardly digestible dextrin and sodium alginate in a mixing ratio of 95:5, dissolving the resulting dietary fiber material in hot water and then converting the resulting solution into powder according to the drying technique specified in the following Table 4. Then the same procedures used in Example 1 were repeated except for using the resulting compositions as the dietary fiber materials to thus prepare square-shaped bread and the resulting bread was evaluated on the basis of the same evaluation criteria used in Example 1. The results obtained in the foregoing evaluation are summarized in Table 4. The data listed in Table 4 clearly indicate that the spray-drying and freeze-drying techniques are excellent drying techniques to be used in the preparation of the composition according to the present invention.

EXAMPLE 5

A water-soluble dietary fiber-containing composition was prepared by admixing various kinds of water-soluble dietary fibers including hardly digestible dextrin as listed in the following Table 5 and sodium alginate in a mixing ratio of 95:5, dissolving each of the resulting dietary fiber materials in hot water and then spray-drying the resulting solution. After the preparation of the composition, the same procedures used in Example 1 were repeated except for using the resulting compositions as the dietary fiber materials to thus prepare square-shaped bread and the resulting bread was evaluated on the basis of the same evaluation criteria used in Example 1. The results obtained in the foregoing evaluation are summarized in Table 5. The data listed in Table 5 clearly indicate that water-soluble dietary fibers other than hardly digestible dextrin may likewise be used in the composition of the present invention.

TABLE 4

| Dietary Fiber Material | | | | Evaluation results on square-shaped bread prepared by way of trial | | | |
|---|---|---|---|---|---|---|---|
| Water-soluble dietary fibers | Thickening polysaccharide | Drying method | Solubility (%) | Bread-Prep. Aptitude | Appearance | Crumb | Taste, Palatability & Flavor |
| Hardly digestible dextrin | Alginic acid salt | Spray-drying | 70 | ○ | ◎ | ◎ | ○ |
| Hardly digestible dextrin | Alginic acid salt | Drum-drying | 60 | X | ◎ | △ | △ |
| Hardly digestible dextrin | Alginic acid salt | Freeze-drying | 65 | ○ | ◎ | ◎ | ○ |

TABLE 5

| Dietary Fiber Material | | | Evaluation results on square-shaped bread prepared by way of trial | | | |
|---|---|---|---|---|---|---|
| Water-soluble dietary fibers | Thickening Polysaccharide | Solubility (%) | Bread-Prep. Aptitude | Appearance | Crumb | Taste, Palatability & Flavor |
| Hardly digestible dextrin | Alginic acid salt | 70 | ○ | ◎ | ◎ | ○ |
| Polydextrose* | Alginic acid salt | 70 | ○ | ◎ | ◎ | ○ |
| Branched maltodextrin** | Alginic acid salt | 70 | ○ | ◎ | ◎ | ○ |

*Polydextrose: "Litesse" (available from Danisco Culter Japan Inc.).
**Branched maltodextrin: "NUTRIOSE" (available from Roquette Freres).

EXAMPLE 6

Frozen wheat noodle (Japanese wheat noodle) was prepared using, as principal ingredients, medium flour, modified starch "MATSUTANI SAKURA" (available from Matsutani Chemical Industry Co., Ltd.) and dietary fiber materials. The dietary fiber materials used herein were the following four kinds of materials: hardly digestible dextrin Material A); water-soluble dietary fiber-containing compositions prepared by admixing hardly digestible dextrin with sodium alginate or agar in mass ratios of 95:5 (Material B) and 90:10 (Material C), dissolving each mixture in hot water and then spray-drying each solution thus prepared; and resistant starch "Nisshoku Lodestar" (available from Nihon Shokuhin Kako Co., Ltd.) (Material D).

To 100 parts of a principal ingredient comprising 69 parts of medium flour, 20 parts of modified starch and 11 parts of each dietary fiber material, there was added 36 parts of a 4% by mass common salt aqueous solution (water for kneading), followed by admixing these components, extending the resulting mixture with a noodle-producing roll and cutting the extended dough into raw noodles using square-shaped rotary blade (No. 10). The characteristic properties of the dough observed during the noodle-production step were evaluated. The results thus obtained are listed in the following Table 6.

The foregoing wheat noodle was introduced into boiling water to thus boil the noodle to such an extent that the water content of the boiled noodle was reached about 65%, the boiled noodle was washed with water immediately after the boiling step, followed by draining the water, introduced into a container, weighing and dividing the noodle into portions (200 g each) and finally subjecting them to a quick freezing step in an atmosphere maintained at −40° C. to thus give frozen wheat noodle. The frozen wheat noodle produced after the quick freezing step was wrapped up with a synthetic resin film, then stored at −20° C. for one month, restored by cooking in boiling water for 2 minutes to thus bring the same back to the edible state and finally inspected for the taste and palatability, resilience and stiffness as well as the smoothness of the noodle. The evaluation of the noodle-preparation aptitude and taste and palatability were evaluated according to the following evaluation criteria. The results thus obtained in these evaluation procedures are listed in the following Table 6. In addition, the rate of the dietary fiber material dissolved out from the noodle when the frozen noodle was restored to bring the same back to the edible state was calculated by the determination of the contents of the dietary fiber material present in the noodle before and after the boiling step. The content of the dietary fiber material was determined according to AOAC2001.03. The results thus determined are likewise listed in Table 6.

(Noodle-Preparation Aptitude)
◎: The noodle-preparation aptitude is quite good;
○: The noodle-preparation aptitude is good;
Δ: The noodle-preparation aptitude is slightly insufficient; and
×: The preparation of the noodle is difficult.

(Stiffness and Resilience)
◎: The noodle is excellent in the resistance to the teeth and resilience and the balance between them is quite good;
○: The noodle has resistance to the teeth and resilience and the balance between them is good;
Δ: The noodle is slightly insufficient in the resistance to the teeth and/or resilience; and
×: The noodle is insufficient in the resistance to the teeth and/or resilience.

(Smoothness)
◎: The noodle is quite rich in the smoothness and it is also excellent in the feeling upon swallowing the same;
○: The noodle is rich in the smoothness and provides a good feeling upon swallowing the same;
Δ: The noodle is slightly insufficient in the smoothness and provides a slightly unsatisfied feeling upon swallowing the same; and
×: The noodle is lack in the smoothness and provides a bad feeling upon swallowing the same.

The results listed in Table 6 indicate that the frozen noodle-preparation aptitude and the quality thereof are not significantly and adversely affected at all even if the composition of the present invention is incorporated into the principal ingredient in an amount of 11 parts per 100 parts of the latter. In addition, the results concerning the rate of the dietary fiber material dissolved out from the noodle indicate that the use of the composition according to the present invention in the foods requiring a boiling step such as frozen noodle as a dietary fiber material would permit the significant reduction in the amount of the dietary fiber material dissolved out from the food through the boiling step.

TABLE 6

| | Evaluation of Frozen Vermicelli Made by way of trial | | | |
|---|---|---|---|---|
| Dietary Fiber Material | Noodle-preparation aptitude | Stiffness and resilience | Smoothness | Rate of dietary fiber material dissolved out (%) |
| A | × | Δ | ◎ | 30.65 |
| B | Δ | ○ | ◎ | 15.91 |

TABLE 6-continued

Evaluation of Frozen Vermicelli Made by way of trial

| Dietary Fiber Material | Noodle-preparation aptitude | Stiffness and resilience | Smoothness | Rate of dietary fiber material dissolved out (%) |
|---|---|---|---|---|
| C | ○ | ◎ | ◎ | 16.16 |
| D | ○ | Δ | X | — |

Material A: Hardly digestible dextrin;
Material B: A product prepared by admixing hardly digestible dextrin and an alginic acid salt, dissolving the resulting mixture in a solvent and subsequently spray-drying the resulting solution (mixing ratio = 95:5);
Material C: A product prepared by admixing hardly digestible dextrin and agar, dissolving the resulting mixture in a solvent and subsequently spray-drying the resulting solution (mixing ratio = 90:10);
Material D: Resistant starch.

What is claimed is:

1. A water-soluble dietary fiber-containing composition comprising a water-soluble dietary fiber material and a thickening polysaccharide in a mixing ratio, by mass, ranging from 95:5 to 80:20 and having a solubility, in water at 30° C., of not more than 80%,
    wherein the water-soluble dietary fiber material is at least one member selected from the group consisting of hardly digestible dextrin, branched maltodextrin and inulin,
    wherein the thickening polysaccharide is at least one member selected from the group consisting of alginic acid salts, propylene glycol ester of alginic acid and agar, and
    wherein the solubility is determined by introducing 100 ml of water maintained at 30° C. into a 200 ml volume beaker, adding, to the water, 10 g of a water-soluble dietary fiber-containing composition while stirring the water at a rotational frequency of 200 rpm using a stirrer, determining the degree of Brix (Brix value) (sugar concentration (w/w %)) after 10 minutes using a digital refractometer (ATAGO RX-5000) and calculating the solubility according to the following equation based on the Brix value:

Solubility (%)=[(Brix value)/10]×100; and wherein said water-soluble dietary fiber-containing composition is prepared by dissolving 80 to 95% by mass of the water-soluble dietary fiber material and 20 to 5% by mass of the thickening polysaccharide in hot water to form an aqueous solution and then drying the aqueous solution.

2. A method for the preparation of a water-soluble dietary fiber-containing composition as set forth in claim 1, comprising the steps of dissolving, in water, a water-soluble dietary fiber material and a thickening polysaccharide such that the mixing ratio of the former to the latter, by mass, ranges from 95:5 to 80:20 and then drying the resulting aqueous solution,
    wherein the water-soluble dietary fiber material is at least one member selected from the group consisting of hardly digestible dextrin, branched maltodextrin and inulin,
    wherein the thickening polysaccharide is at least one member selected from the group consisting of alginic acid salts, propylene glycol ester of alginic acid and agar, and
    wherein the solubility is determined by introducing 100 ml of water maintained at 30° C. into a 200 ml volume beaker, adding, to the water, 10 g of a water-soluble dietary fiber-containing composition while stirring the water at a rotational frequency of 200 rpm using a stirrer, determining the degree of Brix (Brix value) (sugar concentration (w/w %)) after 10 minutes using a digital refractometer (ATAGO RX-5000) and calculating the solubility according to the following equation based on the Brix value:

Solubility (%)=[(Brix value)/10]×100.

3. The method for the preparation of a water-soluble dietary fiber-containing composition as set forth in claim 2, wherein the drying is spray drying.

4. A food characterized in that it comprises a water-soluble dietary fiber-containing composition as set forth in claim 1.

5. The food as set forth in claim 4, wherein it is a bakery's food or a noodle.

6. The water-soluble dietary fiber-containing composition as set forth in claim 1, wherein the solubility, in water at 30° C., is not more than 70%.

7. The water-soluble dietary fiber-containing composition as set forth in claim 1, wherein the water-soluble dietary fiber-containing composition comprises the water-soluble dietary fiber material and the thickening polysaccharide in a mixing ratio, by mass, ranging from 95:5 to 90:10 and having a solubility, in water at 30° C., of not more than 70%.

* * * * *